United States Patent
Beattie et al.

(10) Patent No.: US 11,805,762 B2
(45) Date of Patent: Nov. 7, 2023

(54) PROCESS FOR CONTROLLING THE CONCENTRATION OF DISSOLVED OXYGEN WITHIN A SPECIFIED OPEN BODY OF WATER

(71) Applicant: GIS Gas Infusion Systems Inc., Saint Andrews (CA)

(72) Inventors: Mike Beattie, Saint Andrews (CA); David Glassford, Saint Andrews (CA)

(73) Assignee: GIS Gas Infusion Systems Inc., Saint Andrews (CA)

( * ) Notice: Subject to any disclaimer, the term of this patent is extended or adjusted under 35 U.S.C. 154(b) by 369 days.

(21) Appl. No.: 16/957,255

(22) PCT Filed: Jan. 16, 2019

(86) PCT No.: PCT/CA2019/050060
§ 371 (c)(1),
(2) Date: Jun. 23, 2020

(87) PCT Pub. No.: WO2019/140523
PCT Pub. Date: Jul. 25, 2019

(65) Prior Publication Data
US 2020/0390071 A1  Dec. 17, 2020

Related U.S. Application Data (60) Provisional application No. 62/617,821, filed on Jan. 16, 2018.

(51) Int. Cl.
*A01K 63/04* (2006.01)
*A01K 61/13* (2017.01)
(Continued)

(52) U.S. Cl.
CPC ............ *A01K 63/042* (2013.01); *A01K 61/13* (2017.01); *A01K 63/047* (2013.01); *C02F 1/008* (2013.01);
(Continued)

(58) Field of Classification Search
CPC .... A01K 63/042; A01K 61/13; A01K 63/047; C02F 1/008; C02F 1/20; C02F 1/727;
(Continued)

(56) References Cited

U.S. PATENT DOCUMENTS

| 4,116,164 A | * | 9/1978 | Shabi | ............... A01K 61/10 |
| | | | | 119/225 |
| 4,852,519 A | | 5/1989 | Karlsen | |

(Continued)

FOREIGN PATENT DOCUMENTS

| NO | 20160516 A1 | * | 10/2017 | ............ A01K 61/13 |
| WO | WO-2013066191 A1 | * | 11/2012 | ............ A01K 61/00 |
| WO | 2017155414 A1 | | 9/2017 | |

OTHER PUBLICATIONS

Written Opinion of the International Search Authority in PCT/CA2019/050060 dated Mar. 6, 2019.
(Continued)

*Primary Examiner* — Ekandra S. Miller-Cruz
(74) *Attorney, Agent, or Firm* — Crowe & Dunlevy, P.C.

(57) ABSTRACT

There is provided processes and uses of an inline saturator for maintaining fish in a cage in an open body of water, the process comprising: restricting movement of water into and out of a part of the cage and forming a portion of water within the part of the cage. The process also includes injecting oxygenated water produced by an inline saturator into the portion of water to raise a dissolved oxygen level and to lower a dissolved nitrogen gas level therein. A treatment process is also provided that includes the steps
(Continued)

noted above and further including introducing a medicinal substance into the oxygenated water or the portion of the body of water.

18 Claims, 9 Drawing Sheets

(51) Int. Cl.
  *C02F 1/00* (2023.01)
  *C02F 1/20* (2023.01)
  *C02F 1/72* (2023.01)
  *C02F 7/00* (2006.01)
  *C02F 101/16* (2006.01)
  *C02F 103/20* (2006.01)
(52) U.S. Cl.
  CPC ............... *C02F 1/20* (2013.01); *C02F 1/727* (2013.01); *C02F 7/00* (2013.01); *C02F 2101/16* (2013.01); *C02F 2103/20* (2013.01); *C02F 2209/22* (2013.01)

(58) Field of Classification Search
  CPC .... C02F 7/00; C02F 2101/16; C02F 2103/20; C02F 2209/22; C02F 1/74; Y02A 40/81; Y02W 10/10
  USPC .......................................................... 119/231
  See application file for complete search history.

(56) References Cited

U.S. PATENT DOCUMENTS

| | | | |
|---|---|---|---|
| 7,537,200 B2 | 5/2009 | Glassford | |
| 2016/0174531 A1* | 6/2016 | Boothe | ............... F04D 13/0686 |
| | | | 119/260 |
| 2021/0345590 A1* | 11/2021 | Glomset | ................ A01K 61/60 |

OTHER PUBLICATIONS

International Search Report in PCT/CA2019/050060 dated Mar. 6, 2019.
International Preliminary Report on Patentability in PCT/CA2019/050060 dated Jul. 21, 2020.

* cited by examiner

PROCESS FOR CONTROLLING THE CONCENTRATION OF DISSOLVED OXYGEN WITHIN A SPECIFIED OPEN BODY OF WATER

TECHNICAL FIELD

The invention relates generally to a method and use of gas infusion, and more particularly, to a method and use of gas infusion for preventing excessive mortalities and treating biomass within a contained open body of water.

BACKGROUND

Open-water fish cages can experience rapid variation in dissolved oxygen levels to the point that the fish contained therein can be at risk for sudden death. The variation in dissolved oxygen levels can be attributed to two primary factors: (1) phytoplankton absorbing oxygen at night for respiration when photosynthesis is no longer viable, and (2) the upwelling of deep water with low dissolved oxygen from off the continental shelf due to tides and wind. The reason these factors can create life-threatening conditions is due to the large quantity of fish in a given fish cage is. For fish outside a fish cage, lower levels of dissolved oxygen are generally not life threatening since the required oxygen to sustain a small number of fish per cubic meter is small, and the fish are free to swim to a more oxygen-rich region. The large number of fish per cubic meter within a fish cage naturally means larger amounts of oxygen are required to sustain the fish, and the caged fish do not have the option of swimming to oxygen-rich regions.

Extended periods of exposure to low concentrations of dissolved oxygen in water, also known as aquatic hypoxia, can seriously stress caged fish. Moreover, the latent effects of that stress can endure long after the level of dissolved oxygen recovers to a healthy level. One form of latent stress involves the respiratory system, and in particular, the functionality of hemoglobin. Specifically, prolonged low-levels of dissolved oxygen can result in hemoglobin having trouble picking up and releasing oxygen. As a result, dissolved oxygen levels can return to normal, but the caged fish will still be recovering from respiratory distress hours later. Under these conditions, the fish are particularly vulnerable to subsequent spikes in required oxygen or consequent drops in oxygen levels.

For example, when the fish are fed, oxygen consumption generally increases such that 50% of the consumed oxygen is required for digestion (this is clinically referred to as "specific dynamic action"). Therefore, as the fish ingest food, there is a dramatic increase in internal oxygen demand. If the fish are fed in their vulnerable state, the dramatic increase in internal oxygen demands can't be met and may cause sudden and mass death of the caged fish. A high mortality rate is a death rate of greater than 3-5% of the fish in the cage.

In another example, tarped/skirted caged fish are often medically treated for conditions, such sea lice. The treatment for sea lice tends to distress the fish, which causes them to swim quickly and raises their metabolism. This, in turn, leads to rapid oxygen consumption and depletion of oxygen the body of water. As before, if the internal an/or external dissolved oxygen level gets too low, this can also lead to a sudden and mass death of the caged fish. In such cases, potentially all of the fish in the tarped cage can die.

Moreover, even if the concentration of dissolved oxygen is maintained at normal levels during treatment of the caged fish, such that high mortality rates are prevented, these conditions do not alleviate the stress experienced by the caged fish due to the medical treatment. The higher stress of the caged fish tend to result in lower treatment efficacy.

SUMMARY

This disclosure describes a process for maintaining fish in a cage in an open body of water, the process comprising: restricting movement of water into and out of a part of the cage, forming a portion of water within the part of the cage; and injecting oxygenated water produced by an inline saturator into the portion of water to raise a dissolved oxygen level and to lower a dissolved nitrogen gas level therein.

This disclosure also describes a process for treating fish in a cage in an open body of water, the process comprising: restricting movement of water into and out of a part of the cage, forming a portion of water within the part of the cage; injecting oxygenated water produced by an inline saturator into the portion of water to raise a dissolved oxygen level and to lower a dissolved nitrogen gas level therein; and introducing a medicinal substance into the oxygenated water or the portion of water, and creating a medicinal bath.

BRIEF DESCRIPTION OF THE DRAWINGS

Reference will now be made, by way of example, to the accompanying drawings which show an example of the present application, in which.

DESCRIPTION OF INVENTION

An example embodiment of a system and use of an inline saturator 10 for treating fish in a cage 50 in an open body of water 100 will be discussed. A process 600 for treating caged fish will also be discussed.

System

Inline saturator 10 may be installed as part of a water oxygenation system 11 on a barge, ship, or other structure secured in the area of one or more fish cages. In the example embodiments illustrated in FIGS. 1 and 2, the barge, ship, or structure is referred to herein generally as a platform 12.

Figure 1:
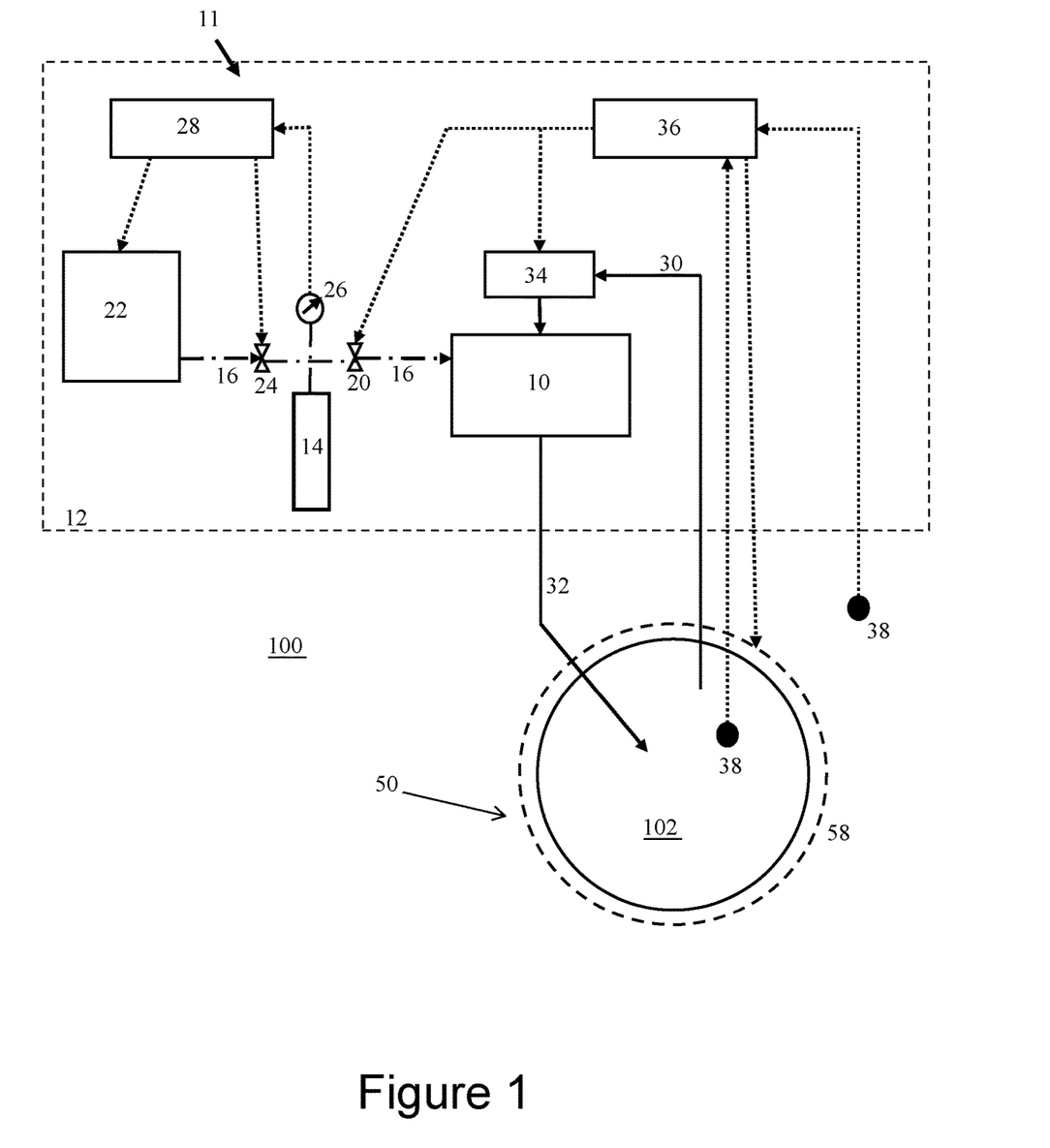
FIG. 1 is a schematic of a water oxygenation system with an inline saturator in use with a fish cage according to an example embodiment of the present invention.
Figure 2:
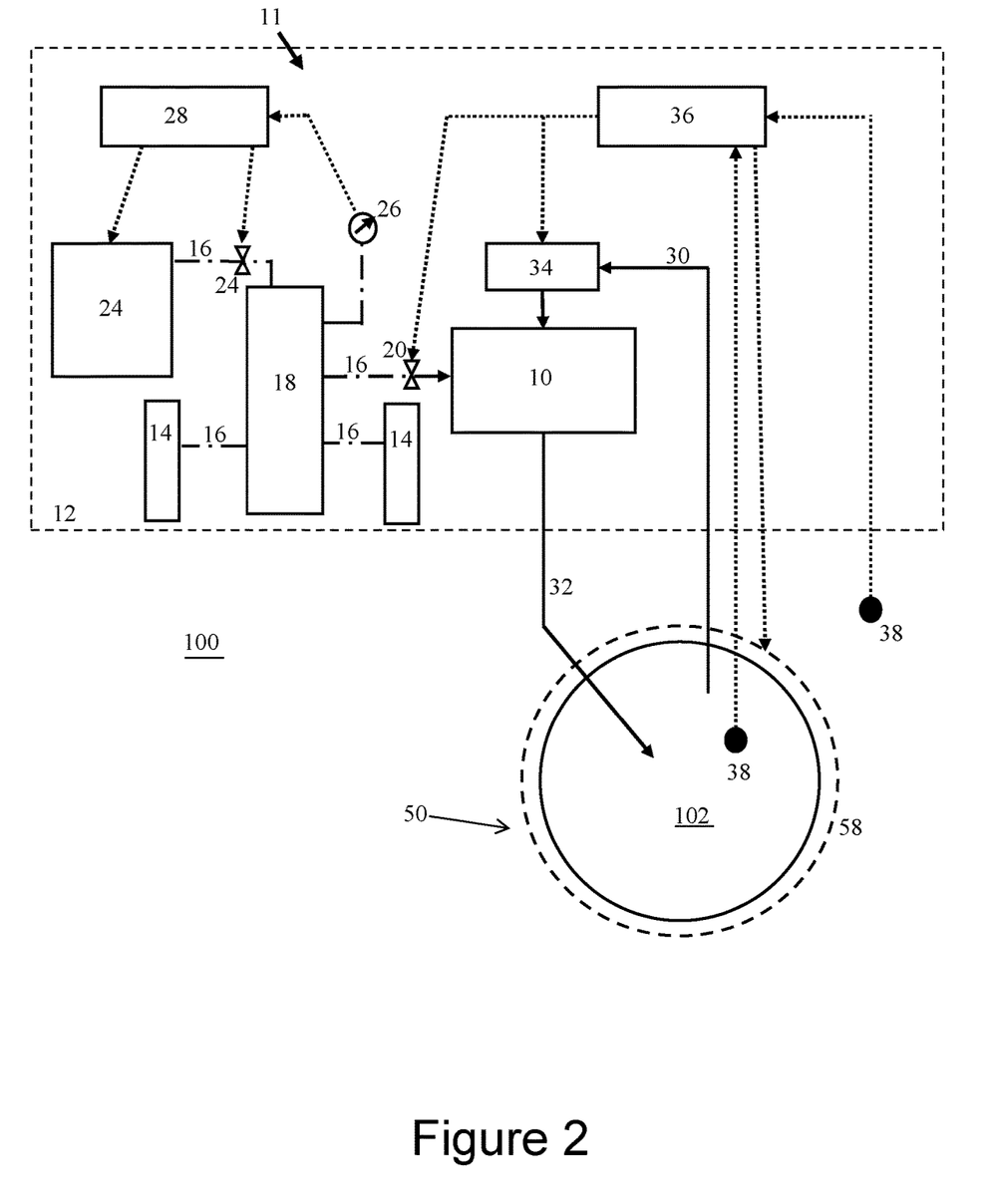
FIG. 2 is a schematic of a water oxygenation system with an inline saturator in use with a fish cage according to another example embodiment of the present invention.

Platform 12 includes electrical generator (not shown) to supply electrical power to water oxygenation system 11. As shown in FIG. 1, water oxygenation system 11 has a single oxygen tanks 14 is individually connected to a gas injection port (not shown) via an oxygen line 16 to supply oxygen to inline saturator 10. As shown in FIG. 2, multiple oxygen tanks 14 may be grouped together and each connected to an oxygen supply manifold 18. Oxygen supply manifold 18 is, in turn, connected to inline saturator 10 through a gas injection port and an oxygen line 16. As understood by the skilled person, water oxygenation system 11 may have more than one inline saturator 10 fluidly coupled to a single oxygen tanks 14, or to oxygen supply manifold 18.

Each connection between oxygen tank 14 or oxygen supply manifold 18 and a gas injection port on its corresponding inline saturator 10 is a gas injection regulator 20 for controlling the flow rate of oxygen into inline saturator 10.

Each oxygen tank 14 also includes a shut-off valve (not shown) so that the tank can be isolated and replaced when depleted. Depleted oxygen tanks will be refilled either directly or through oxygen supply manifold 18 by an oxygen generator system 22. An oxygen supply control valve 24 is positioned between oxygen generator system 22 and oxygen tank 14 or oxygen supply manifold 18. Oxygen supply control valve 24 is configured to be closed when oxygen generator system 22 is not supplying oxygen to oxygen tank 14 or oxygen supply manifold 18. Conversely, oxygen supply control valve 24 is open when oxygen generator system 22 is activated and supplying oxygen tank 14 or oxygen supply manifold 18 with oxygen.

When a single oxygen tank 14 is connected to inline saturator 10, as shown in FIG. 1, oxygen tank 14 will have an oxygen pressure sensor 26. When multiple oxygen tanks 14 are connected to oxygen supply manifold 18, oxygen supply manifold 18 will be connected to oxygen pressure sensor 26.

Oxygen generator system 22 is operatively coupled to, and controlled by, a control and monitoring system 28. Control and monitoring system 28 is in communication with oxygen pressure sensor 26 and triggers oxygen generator 22 when the oxygen gas pressure detected by oxygen pressure sensor 26 drops below a predetermined lower set point. Oxygen generator 22 will remain on until the pressure rises above a desired upper set point. Control and monitoring system 28 is also in communication with oxygen supply control valve 24, which is associated with oxygen pressure sensor 26. Control and monitoring system 28 is configured to open oxygen supply control valve 24 to enable oxygen flow to oxygen tank 14 or oxygen supply manifold 18. When the desired upper set point pressure is reached, control and monitoring system 28 closes oxygen supply control valve 24.

Inline saturator 10 is adapted to inject dissolved oxygen into water and to remove nitrogen from the water, creating oxygenated water, while maintaining the overall total gas pressure. Inline saturator 10 as shown in the depicted embodiments is based on the saturator described in U.S. Pat. No. 7,537,200.

Water oxygenation system 11 further includes an intake pipe 30 and an output pipe 32, where one end of intake pipe 30 and one end of output pipe 32 is situated within cage 50. Intake pipe 30 is operatively coupled to a pump 34 which is adapted to draw water from within cage 50 and direct the water into inline saturator 10. Output pipe 32 is also coupled to inline saturator 10 to direct and discharge water from inline saturator 10 back into the caged area.

In the depicted embodiments, water oxygenation system 11 is also operated by a second control and monitoring system 36. Control and monitoring system 36 is in communication with a dissolved oxygen sensor 38 positioned within fish cage 50. Based on the signals from dissolved oxygen sensor 38, control and monitoring system 36 is coupled and adapted to activate gas injection regulator 20 and pump 34 to inject oxygen and water into inline saturator 10.

Inline saturator 10 is fluidly coupled through output pipe 32 to a distribution device 39 positioned at the centre of cage 50.

Figure 3:
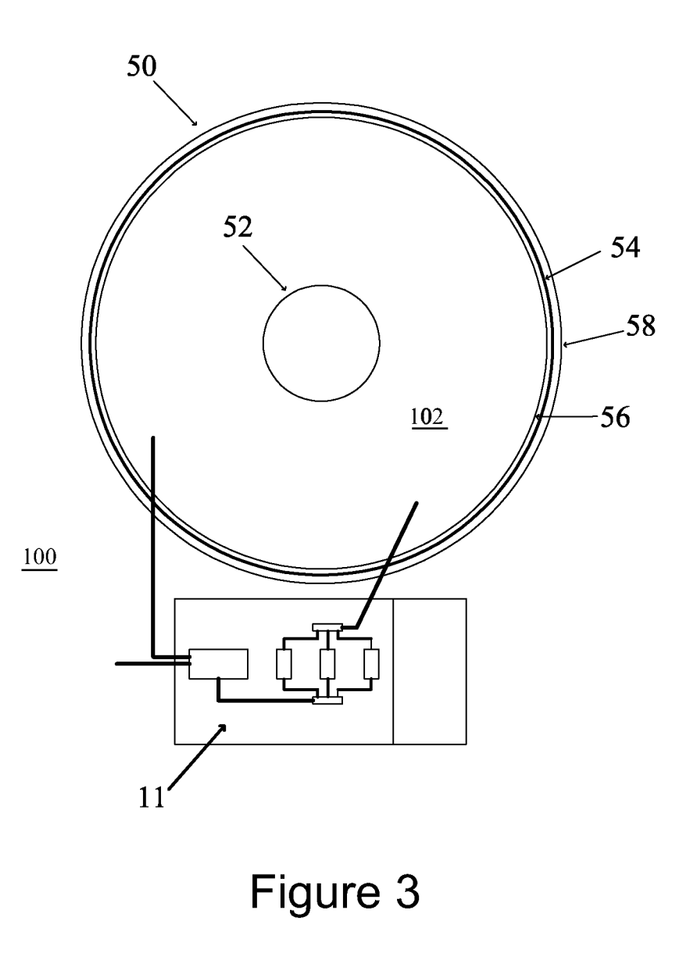
FIG. 3 is a plan view a water oxygenation system with inline saturators in use with a fish cage according to a further example embodiment of the present invention.
Figure 4:
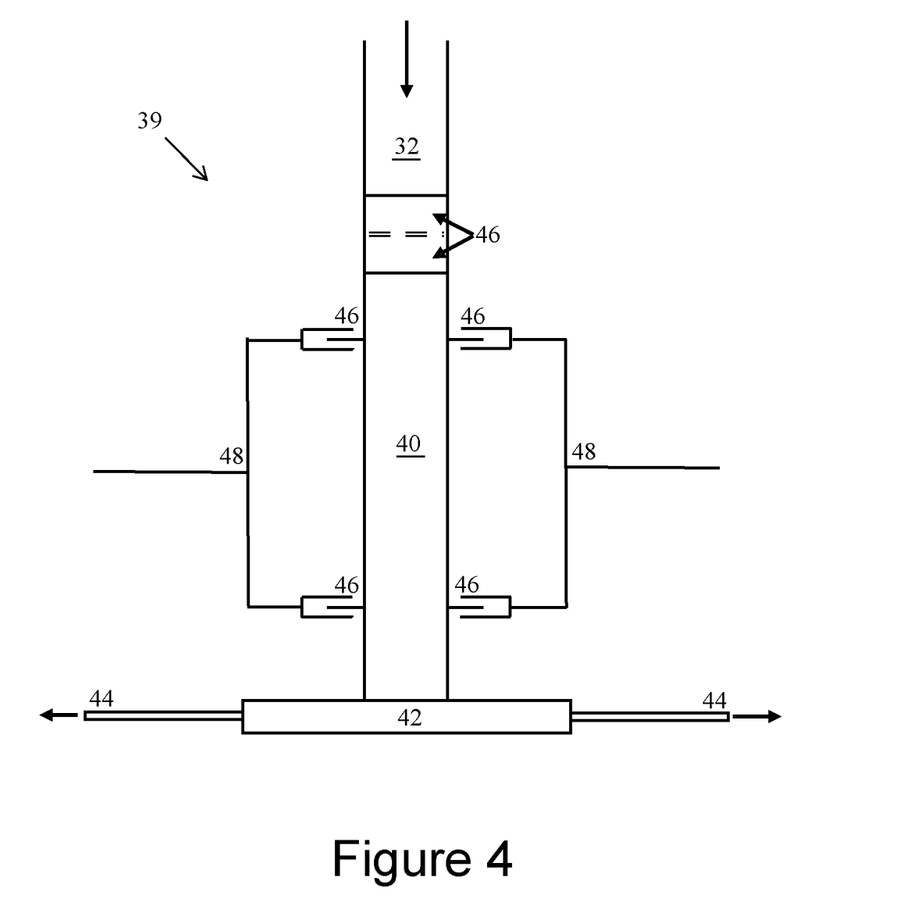
FIG. 4 is a side view of a rotating head in isolation according to an example embodiment.

Distribution device 39 is supported by a bird ring 52 (see FIG. 3) at the center of cage 50. Bird ring 52 is a center ring which supports the netting at the top of cage 50 which is used to prevent birds from landing in cage 50 and eating the fish food. As shown in FIG. 4, bearings 46 connect distribution device 39 to a support structure 48, which in turn is connected to bird ring 48.

Distribution device 39 includes a rotating supply pipe 40, a rotating head 42 and discharge pipes 44. Rotating supply pipe 40 is fluidly coupled to an end of output pipe 32 with a coupler 46. Unlike output pipe 32, rotating supply pipe 40 is adapted to rotate with rotating head 42, which can freely rotate.

Figures 5, 6:
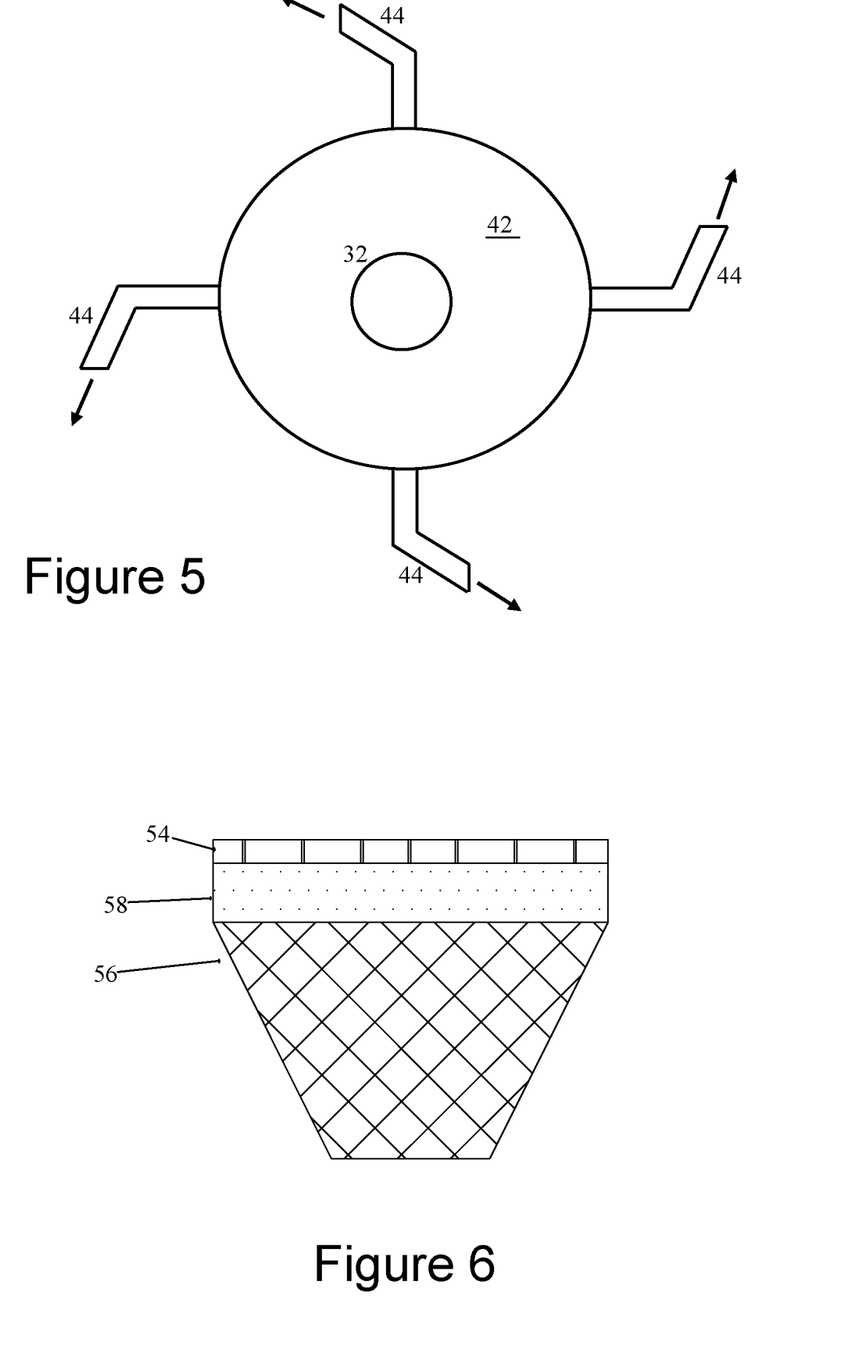
FIG. 5 is a plan view of the rotating head of FIG. 4.
FIG. 6 is a side view of the fish cage of FIG. 1 in isolation.

As best seen in FIG. 5, discharge pipes 44 are rigid and shaped to promote rotation of head 42 as the water travels through output pipe 32, through rotating supply pipe 40, into rotating head 42 and discharged from discharge pipes 44. Discharge pipes 44 generally extend radially from rotatable head 42 in a plane which is perpendicular to the rotatable head's axis of rotation, which is vertical. The free end of discharge pipes 44 are shaped as a nozzle to promote head rotation and shaped to project the water both horizontally outward and vertically downward into the caged water.

FIG. 6 shows cage 50 having a cage structure 54, net 56 and a skirt 58 positioned around a part of net 54, thereby enclosing a portion of water 102.

Skirt 58 in the present embodiment is motorized and controllable. Skirt 58 is further substantially non-porous in order to limit or restrict water from flowing through skirt 58. Skirt 58 is put in place around net 56 to contain the oxygenated water injected therein.

Skirt 58 is operatively coupled to control and monitoring system 36 and is adapted to generally have both automatic and manual operation modes. The automatic mode is used to maintain normal oxygenation levels, while the manual mode is used to maintain abnormally high oxygenation levels. Control and monitoring system 36 is further coupled to another dissolved oxygen sensor 38, which is situated in open water 100 just outside cage 50.

Whereas specific embodiments of uses of an inline saturator 10 for treating fish in a cage 50 in an open body of water 100 are herein shown and described, variations are possible.

In some examples, rather than having multiple control and monitoring systems, all of the above noted functions can be controlled, recorded, and monitored remotely via a wireless communication network, and these functions can all be incorporated into a master control and monitoring system on platform 12.

In other examples, the system may consist of multiple water oxygenation systems 11 and/or multiple fish cages 50, where one water oxygenation system is generally associated with each fish cage. Depending on the volume of the fish cages and the capacity of the water oxygenation system, multiple water oxygenation systems could be operatively coupled to a single cage, or a single water oxygenation system could serve several cages.

In other examples, rather than skirt 58 being motorized and controllable, skirt 58 may be manually controllable.

In other examples, rather than extracting water from inside cage 50, the intake end of intake pipe 30 may be positioned outside cage 50 to take in water from outside cage 50 for water oxygenation system 11.

In the examples which use a sufficiently large-capacity oxygenation system, which can service multiple cages, a pump could be used to draw water from both cages through piping to the large-capacity oxygenation system. Following oxygenation, the water will pass from the water oxygenation system into an output flow manifold featuring multiple control valves, where the control valves regulate the flow of oxygenated water back to the individual cages. The control and monitoring system will regulate the associated flow control valve on the output flow manifold to direct the oxygenated water flow to the desired fish cage.

The control and monitoring system will also control the flow through the other control valves on the manifold. Since the flow through a control valve is driven by the level of dissolved oxygen dropping below a desired minimum set point as measured by a dissolved oxygen sensor, the control and monitoring system will also be in communication with the dissolved oxygen sensor associated with each control valve on the output flow manifold. The control and monitoring system will further have provision for remote monitoring, data logging, and control via a wireless network.

For the case of multiple water oxygenation systems on the platform, the associated control and monitoring systems for each water oxygenation system may be integrated into a single master control and monitoring system, which may also handle the control and monitoring for all oxygen generation on the platform.

In other examples, rather than a central discharge head, the pipe delivering oxygenated water to the fish cage may be attached to the rim of the cage and then extend along the rim as a rim flow pipe. The discharge pipes would extend from the rim flow pipe. The discharge pipes, in this case, would also be positioned to promote a circular current within the cage. The end of these discharge pipes may also be shaped to project the water toward the cage center and vertically downward into the water.

For this alternative embodiment, to maintain a consistent flow rate of oxygenated water at each discharge point, either balancing valves will be placed between the rim flow pipe and the point where water is discharged, or the cross-sectional area of the rim flow pipe will be suitably reduced as the water passes each discharge pipe.

Process and Use

As noted above, the system described herein has an automatic and a manual operation mode. The automatic mode is used to maintain normal oxygenation levels in a process 700 to sustain fish in cage 50 in body of water 100 and to prevent high fish mortalities. The manual mode is used to maintain abnormally high oxygenation levels in a treatment process 900 for medicating fish in cage 50 in open body of water 100 without major fish kills.

Maintenance Process

Figure 7:
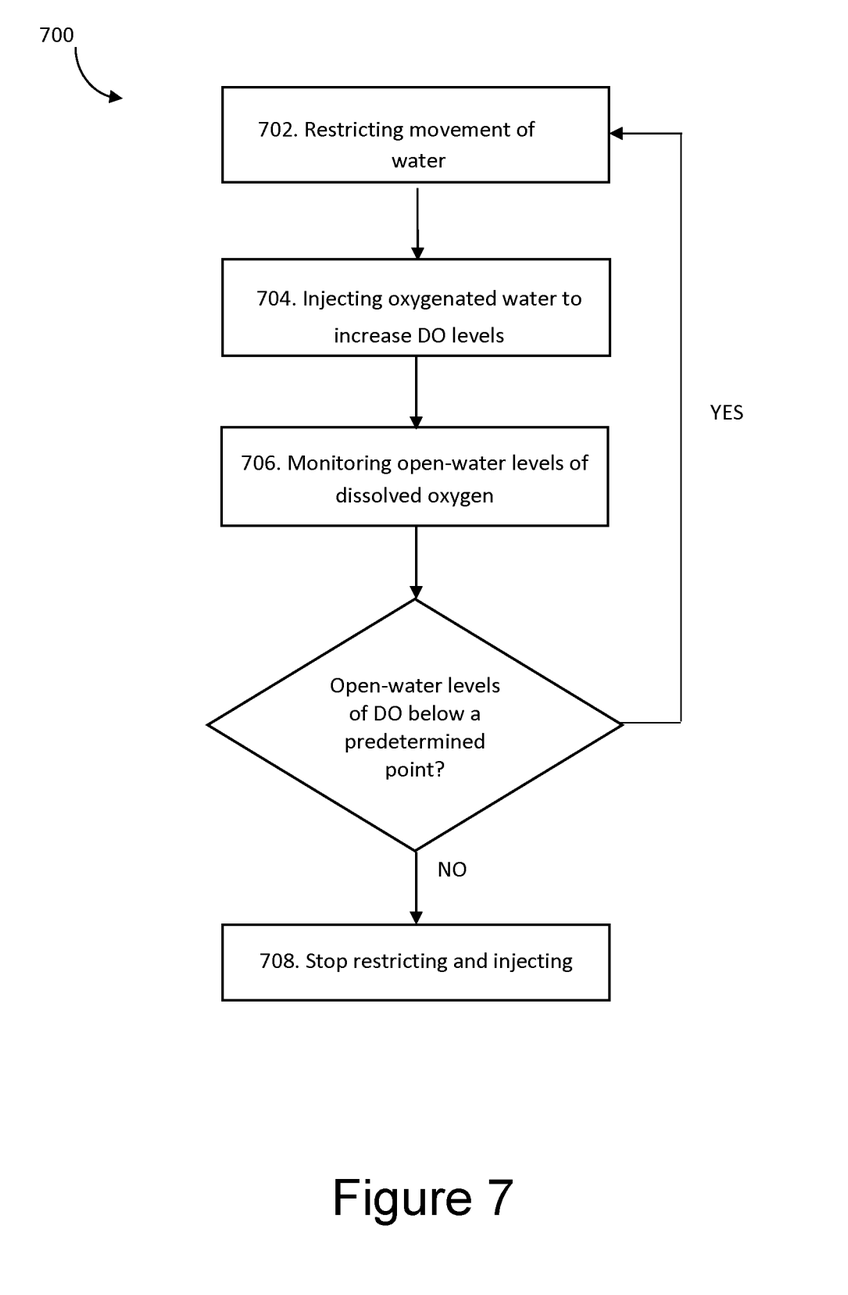
FIG. 7 is a flow chart illustrating an exemplary embodiment of a process in accordance with the present invention.

As best seen in FIG. 7, process 700 first involves restricting movement of water into and out of a part of cage 50, thereby forming a portion of water 102 at 702, and then injecting oxygenated water produced by inline saturator 10 into portion of water 102 at 704. This raises a dissolved oxygen level in portion of water 102 to at least 100% saturation and lowers a dissolved nitrogen gas level therein.

Control and monitoring system 36 monitors at 706 the open-water levels of dissolved oxygen immediately outside of portion of water 102 based on input from open-water dissolved oxygen sensor 38.

When open-water levels of dissolved oxygen fall below a desired level, and consequently the DO within cage 50 also falls, below 100% saturation for example, skirt 58 will be deployed to restrict movement of water into and out of portion 102 and water oxygenation system 11 will be activated. Inline saturator 10 will dissolve oxygen into a stream of water directed from portion water 102 and remove nitrogen from the stream of water, thereby producing the oxygenated water. The oxygenated water, which has dissolved oxygen levels of at least 100% saturation, for example, is then injected back into portion of water 102 within skirt 58. In this manner, the dissolved oxygen level in portion 102 is eventually raised to, and is maintained at, at least 100% saturation.

If you do not tarp the cage when trying to oxygenate, tidal currents will simply push the newly oxygenated water out of the cage.

The oxygenated water, in the present case, is rotationally injected into portion of water 102, to encourage dispersion of the oxygenated water therein. In particular, the oxygenated water is rotationally injected from the centre of cage 50 into portion 102.

After skirt 58 has been deployed, control and monitoring system 36 continues to monitor the open-water levels of dissolved oxygen immediately outside of portion of water 102. Skirt 58 continues in the deployed position until the open-water levels of dissolved oxygen rise above a desired set point, 100% saturation for example. At that point, 708, control and monitoring system 36 will retract skirt 58 and deactivate water oxygenation system 11.

Treatment Process

When skirt 58 is in the manual operating mode, the commands of control and monitoring system 36 are overridden. In this way, control and monitoring system 36 ignores open-water dissolved oxygen sensor 38 and the dissolved oxygen levels may be driven to abnormally high levels. The manual operation mode, or treatment process 900, is used during treatments to maintain abnormally high oxygenation levels for medicating fish in cage 50 in open body of water 100 without high fish mortalities.

When treating fish within cage 50 is desired, for sea lice remediation for example, abnormally high oxygenation levels within cage 50 are desired. This is because the treatment for sea lice distresses the fish, which causes them to swim quickly, thereby raising their metabolism. This, in turn, leads to rapid oxygen depletion within cage 50. Of course, if the dissolved oxygen level gets too low, then this can lead to a high fish mortalities.

The stress can be relieved by driving the concentration of dissolved oxygen well above normal saturation levels while maintaining the total gas pressure in the water. The reduction in stress is caused by the chemosensory neuroepithelial cells (NECs) located in the epithelial layer of the primary gill filaments. These cells drive autonomous cardiorespiratory reflexes and behavior modification in fish by releasing serotonin in response to the elevated dissolved oxygen level. As a result, sufficiently high levels of dissolved oxygen will result in increasing levels of serotonin that will autonomously cause the fish to calm and patiently endure their treatment.

Figure 9:
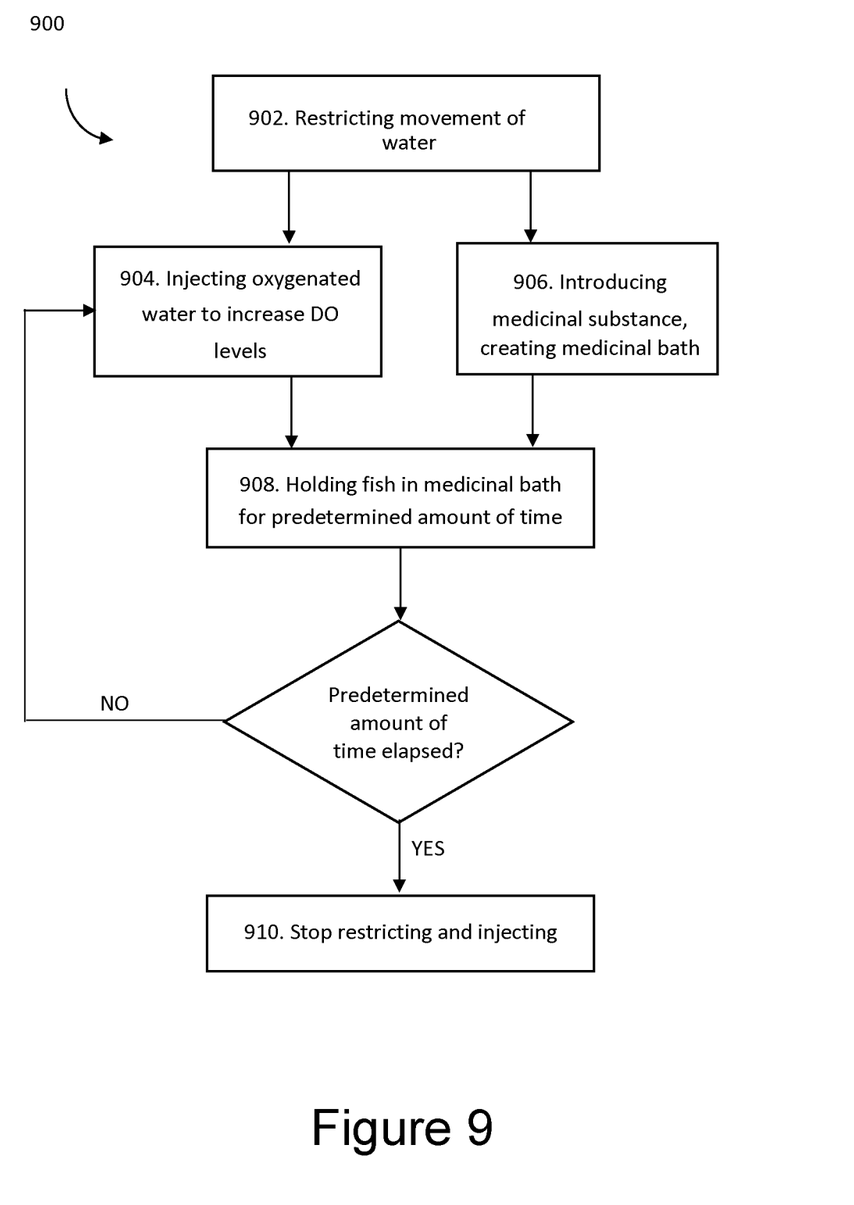
FIG. 9 is a flow chart illustrating another exemplary embodiment of a process in accordance with the present invention.

In that regard, similar to process 700, treatment process 900 involves restricting movement of water into and out of at least a part of cage 50, thereby forming a portion of water 102 at 902 within the part of the cage, injecting oxygenated water produced by inline saturator 10 into portion of water 102 at 904. This raises a dissolved oxygen level in portion of water 102 to and lowers a dissolved nitrogen gas level therein.

When in the manual mode, skirt 58 will be deployed to restrict movement of water into and out of portion 102 and water oxygenation system 11 will be activated. As before, inline saturator will dissolve oxygen into a stream of water directed from portion of water 102 and remove nitrogen from the stream of water, thereby producing the oxygenated water. The oxygenated water, which has dissolved oxygen levels of greater than 100% saturation is then injected back into portion of water 102 within skirt 58. In this manner, the dissolved oxygen level in portion 102 is eventually raised to, and is maintained at, greater than 100% saturation.

In process 900, the dissolved oxygen level within skirt 58 is raised to at least 100% saturation and maintained at 100% saturation or greater throughout the treatment process.

The oxygenated water, similar to process 700, is rotationally injected into portion of water 102, to encourage dispersion of the oxygenated water therein. In particular, the oxygenated water is rotationally injected from the centre of cage 50 into portion 102.

Treatment process 900 includes introducing a medicinal substance into the oxygenated water or portion of water 102 at 906, and creating a medicinal bath. The medicinal substance injected into the oxygenated water or portion 102 is at least one of pyrethroids, organophosphates, and hydrogen peroxide.

Treatment process 900 further includes holding the fish in the medicinal bath at 908 for a predetermined amount of time, for example, one hour. Holding the fish in the medicinal bath allows for the medicinal substance to be absorbed by the fish. During this holding period, oxygenated water continues to be injected into portion of water 102 within skirt 58 to maintain the DO levels at 150% saturation or greater throughout the treatment process.

After the predetermined amount of time has elapsed, at 910, control and monitoring system 36 will retract skirt 58 and deactivate water oxygenation system 11.

Whereas specific embodiments of processes for sustaining and treating fish in a cage 50 in an open body of water 100 are herein shown and described, variations are possible.

In some examples, for process 700, rather than raising the dissolved oxygen level of portion of water 102 within skirt 58 to 100% saturation, the dissolved oxygen level within skirt 58 may be raised to over 70% saturation.

In some examples, for treatment process 900, rather than raising the dissolved oxygen level within skirt 58 to 100% saturation, the dissolved oxygen level within skirt 58 may be raised to at least 150% saturation and maintained at 150% saturation or greater throughout the treatment process.

In some examples, for treatment process 900, rather than raising the dissolved oxygen level within skirt 58 to 100% saturation, the dissolved oxygen level within skirt 58 may be raised to at least 200% saturation and maintained at 200% saturation or greater throughout the treatment process.

In other examples, for treatment process 900, treatment process 900 further includes raising a portion of cage 50 out of body of water 100 to reduce an overall volume of water within cage 50 before injecting the medicinal substance. Raising cage 50 in this manner reduces the volume of water within cage 50 in which the fish can swim, thus physically limiting the distance to which the fish may swim away from skirt 58 and to encourage swimming within portion of water 102.

In other examples, for both process 700 and treatment process 900, rather than rotationally injected the oxygenated water from the centre of cage 50 into portion of water 102, the oxygenated water is rotationally injected from a circumference of cage 50 into portion of water 102.

In yet other examples, for both process 700 and treatment process 900, rather than extracting the stream of water from portion 102 inside cage 50 for processing by inline saturator 10, a stream of water from outside cage 50 may be drawn into inline saturator 10 for oxygenation, then injected into portion of water 102.

An advantage of the present invention is that the present system and process prevents extended periods of exposure by caged fish in open bodies of water to low concentrations of dissolved oxygen in water. High fish mortalities tend to be avoided since the dissolved oxygen levels in the water in which the fish are held are generally maintained around normal, or about or above 100% saturation of DO in spite of the variability of DO in open water systems.

Another advantage of the present invention is that it also allows for abnormally high levels of dissolved oxygen in the water in which the fish are held during treatment of the fish.

The oxygen levels inside a tarped cage will begin to drop below 100% DO within 5 minutes from the start of treatment, and will continue to fall throughout the treatment.

As noted earlier, the fish are extremely stressed during treatment, as the medicinal products being added to the water inside the cage tend to particularly irritate the fish gills and eyes. As a result, the treated fish swim quickly and erratically, thereby increasing their demand for, and consumption of, oxygen. If the DO levels fall below 70%, mass mortality of the fish will tend to result.

In the past, when/if DO levels fall below 70% before the end of the treatment, the site workers would simply drop the skirt/tarp and flush out the chemical and supply the fish with new water having about 100% DO.

However, prematurely dropping the skirt/tarp reduces the exposure of the fish to the medicinal substance. Total exposure is directly related to the efficacy of any treatment in fish where total exposure is equal to dose×time.

Sufficiently high levels of dissolved oxygen will result in increasing levels of serotonin in the fish that will autonomously cause the fish to calm and patiently endure their treatment. Raising the DO levels in the portion of water within the tarp to 100% or higher, thus, allows the fish to be treated for the recommended amount of time while also reducing their stress level. This increases the efficacy of the treatment and reducing the number of fish death during treatment.

A further advantage of the present invention is that the system and process may be employed independent of water temperature and DO levels may be maintained at 100% or higher regardless of cage biomass. Many existing oxygenation systems tend to fail or underperform in open water areas that are consistently experiencing low dissolved oxygen levels (i.e. in September and early October) in conjunction with high water temperatures.

The following tests were conducted to demonstrate one or more of these advantages.

Fish Maintenance Testing

In performance of process 700, three inline saturator units, for example ILS 1200 units as described in PCT/CA2018/051671, were placed on a 60 foot barge along with ancillary equipment, including 4" outlet hoses, 4" header junctions, etc. Water was moved by a 50 HP pump. The 6"

suction/intake for the system was positioned outside of the cage to prevent blockage from extensive seaweed build up found inside the cage.

A 100 meter diameter polar circle cage was tarped to a depth of 5 meters and encompassed approximately 4000 cubic metres of sea water and approximately 35000 3 lb Atlantic Salmon. Measurements were taken at a depths of 3 meters and 1 meter at positions North, South, East and West along the perimeter of the cage. Results at 1 meter were found to be approximately 10% higher at the very beginning. However, this gap shrank as the trial progressed and the oxygenated water dispersed more evenly throughout the cage. Results were obtained using a YSI Pro multiparameter meter/probe.

Based on the inventor's calculations and experience at the site, tarping the cage would typically cause a reduction in oxygen of about 10% over the time of the experiment based on the number of fish present and oxygen consumption rates. A summary of the results is found in Table 1 below and FIG. 8.

TABLE 1

| Time | Ambient outside | South | East | North | West |
|---|---|---|---|---|---|
| 1:30:00 PM | 102.3 | 115 | | | |
| 1:35:00 PM | | 132.5 | | | |
| 1:45:00 PM | | 134.6 | | | |
| 1:40:00 PM | | | 118 | 117.2 | |
| 1:45:00 PM | | | | | 117.5 |
| 2:05:00 PM | 104.3 | | 127.1 | 124.3 | |
| 2:15:00 PM | | 126.5 | | | 123.8 |
| 2:35:00 PM | | 129.1 | | | 125.6 |

Figure 8:
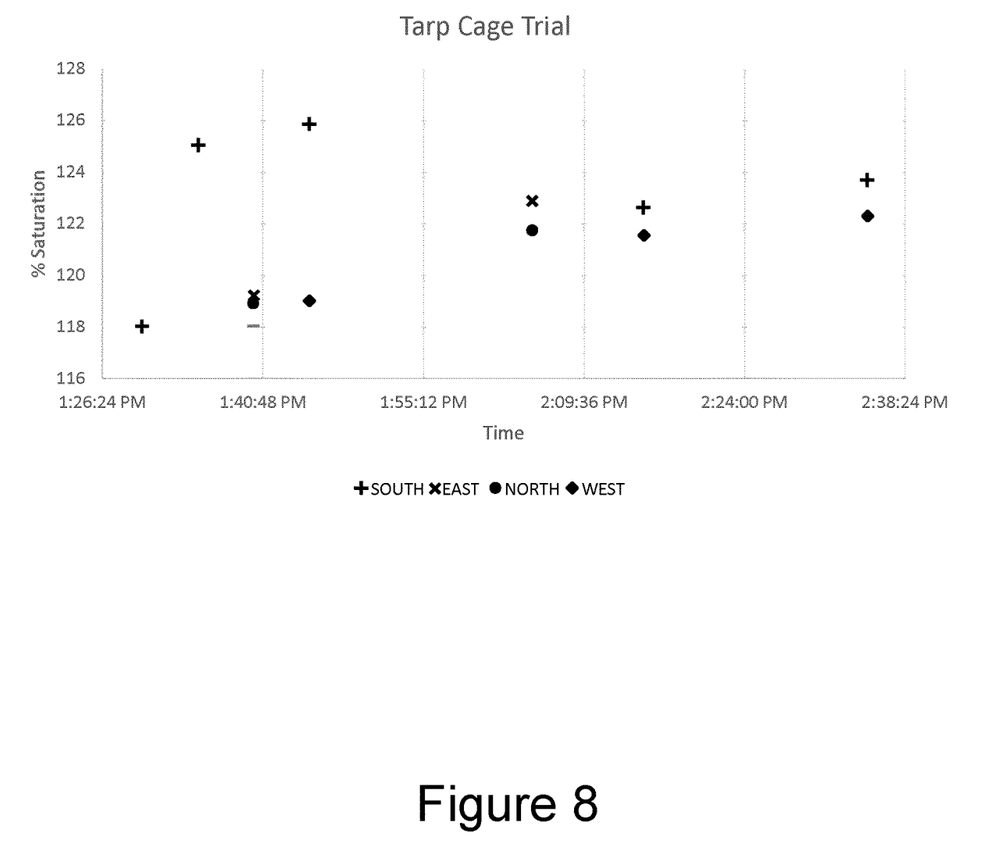
FIG. 8 is a graph illustrating the dissolved oxygen percent data.

As shown in the above table and FIG. 8, the dissolved oxygen levels in the water in which the fish are held are generally maintained at about or above 100% saturation of DO in spite of the variability of DO in open water systems. This maintenance of the DO levels prevent the caged fish from experiencing low levels of DO, and potential high rates of mortalities.

Fish Treatment Testing

In performance of treatment process 900, the treatment used in this example was a topical bath prescribed to eliminate/control a fungal outbreak (*Saprolegnia* sp). The prescribed treatment was bathing fish in 200 ppm formalin (a saturated 37% aqueous solution of formaldehyde gas) for a period of 1 hour in a first fish cage having 100% DO in the portion of water enclosed by the tarp, second fish cage having 150% DO in the portion of water enclosed by the tarp, and a third fish cage having 200% DO in the portion of water enclosed by the tarp.

Figure 10:
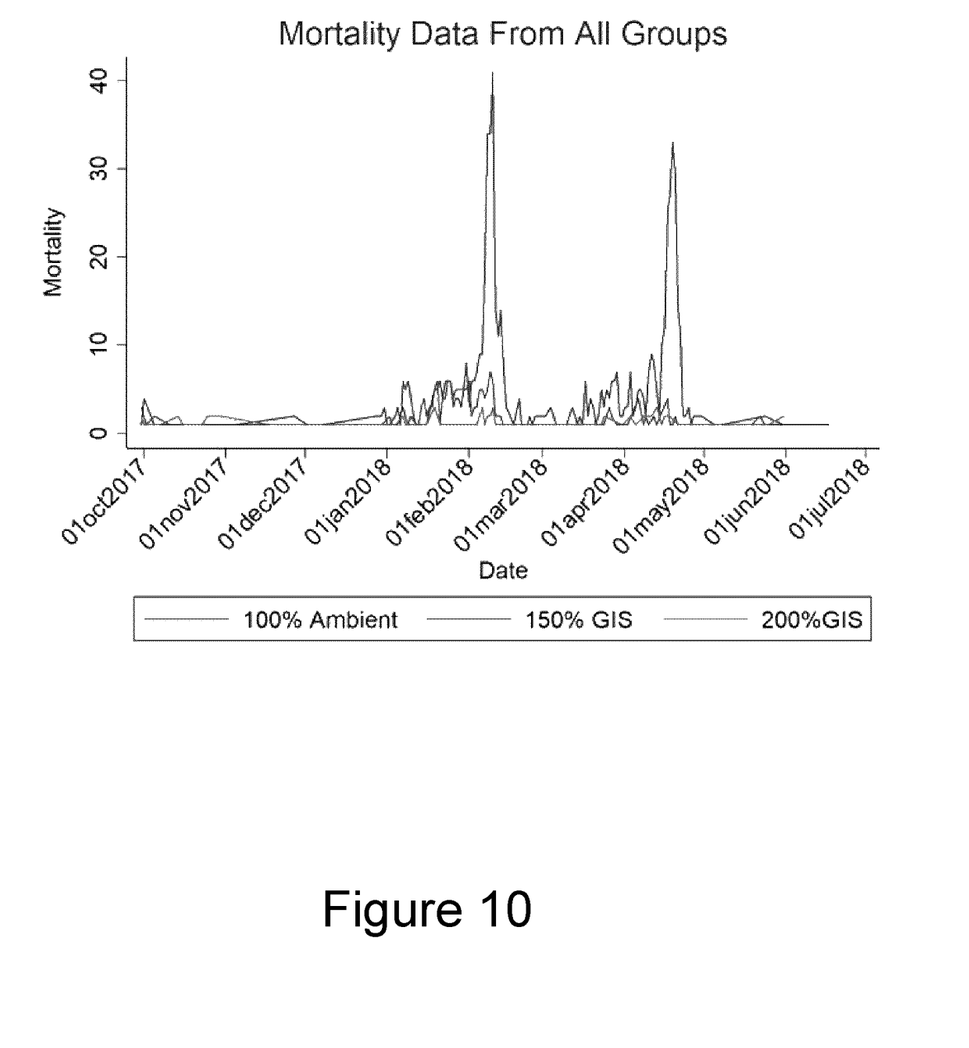
FIG. 10 is a graph illustrating a summary of the mortality test trial data in an enclosed system.

The results are illustrated in FIG. 10 for each of the three cages. The x-axis is shows the days and the y axis describes the number of individual fish mortalities per day based on an initial population of 1000 fish being treated.

In the first fish cage, a mortality of 40 (~4%) fish was found on a given day in early February, 2018 and a mortality of about 33 (~3%) fish was found on a given day in late April, 2018 when treatment process 900 was performed with the 200 ppm formalin (a saturated 37% aqueous solution of formaldehyde gas) for a period of 1 hour. Moreover, nearly no fish mortalities were found on those same days in the cages with 150% DO and 200% DO. This is a stark improvement to the mass mortality of the fish that likely results if no oxygen were added.

Accordingly, the invention should be understood to be limited only by the accompanying claims, purposively construed.

The invention claimed is:

1. A process for maintaining fish in a cage in an open body of water, the process comprising: restricting movement of water into and out of a part of the cage, forming a portion of water within the part of the cage; and injecting oxygenated water produced by an inline saturator into the portion of water to raise a dissolved oxygen level and to lower a dissolved nitrogen gas level therein, wherein the oxygenated water is injected into the portion of water via a distribution device, the distribution device comprises a rotating supply pipe configured to circumferentially rotate during the injection of the oxygenated water to thereby rotationally inject the oxygenated water from the distribution device into the portion of water and encourage dispersion of the oxygenated water therein; wherein the process comprises monitoring the dissolved oxygen level in the portion of water, and performing the restricting and injecting when the monitored dissolved oxygen level falls below a predetermined level.

2. The process of claim 1, wherein the inline saturator dissolves oxygen into a stream of water from the body of water and removes nitrogen from the stream of water, producing the oxygenated water for injection.

3. The process of claim 2, further comprising monitoring the dissolved oxygen level immediately outside of the portion of water, and performing the restricting and injecting when the dissolved oxygen level immediately outside the portion of water and the dissolved oxygen level in the portion of water fall below the predetermined level.

4. The process of claim 3, further comprising ceasing the restricting and injecting when the dissolved oxygen level immediately outside the portion of water rises above the predetermined level.

5. The process of claim 1, wherein the dissolved oxygen level is raised to above 70 percent saturation.

6. The process of claim 5, wherein the dissolved oxygen level is raised to at least 100 percent saturation.

7. The process of claim 6, wherein the movement of water is restricted by a tarp or skirt enclosing the part of the cage.

8. A process for treating fish in a cage in an open body of water, the process comprising: restricting movement of water into and out of a part of the cage, forming a portion of water within the part of the cage; injecting oxygenated water produced by an inline saturator into the portion of water to raise a dissolved oxygen level and to lower a dissolved nitrogen gas level therein, wherein the oxygenated water is injected into the portion of water via a distribution device, the distribution device comprises a rotating supply pipe configured to circumferentially rotate during the injection of the oxygenated water to thereby rotationally inject the oxygenated water from the distribution device into the portion of water and encourage dispersion of the oxygenated water therein; and introducing a medicinal substance into the oxygenated water or the portion of water, and creating a medicinal bath; wherein the process comprises monitoring the dissolved oxygen level in the portion of water, and performing the restricting and injecting when the monitored dissolved oxygen level falls below a predetermined level.

9. The process of claim 8, wherein the inline saturator dissolves oxygen into a stream of water from the body of water and removes nitrogen from the stream of water, producing the oxygenated water for injection.

10. The process of claim 9, wherein the dissolved oxygen level is raised to at least 100 percent saturation and maintained at 100 percent saturation or greater throughout the process.

11. The process of claim 10, wherein the dissolved oxygen level is raised to at least 150 percent saturation and maintained at 150 percent saturation or greater throughout the process.

12. The process of claim 11, wherein the dissolved oxygen level is raised to at least 200 percent saturation and maintained at 200 percent saturation or greater throughout the process.

13. The process of claim 12, wherein the medicinal substance injected is at least one of pyrethroids, organophosfates, and hydrogen peroxide.

14. The process of claim 13, further including holding the fish in the medicinal bath for a predetermined amount of time.

15. The process of claim 14, wherein the fish are held in the medicinal bath for an amount of time sufficient to treat the fish.

16. The process of claim 8, wherein the oxygenated water is rotationally injected from a centre of the cage into the portion of the body of water.

17. The process of claim 8, wherein the oxygenated water is rotationally injected from a circumference of the cage into the portion of the body of water.

18. The process of claim 17, wherein the movement of water is restricted by a tarp or skirt enclosing the part of the cage.

\* \* \* \* \*